United States Patent
Cote et al.

(10) Patent No.: US 11,855,909 B2
(45) Date of Patent: Dec. 26, 2023

(54) SYSTEM AND METHOD FOR MANAGING NETWORK RESOURCES

(71) Applicant: SERVICENOW CANADA INC., Montreal (CA)

(72) Inventors: Marie-Claude Cote, Montreal (CA); Thomas Fortier, Montreal (CA); Alexei Nordell-Markovits, Montreal (CA)

(73) Assignee: SERVICENOW CANADA INC., Montreal (CA)

( * ) Notice: Subject to any disclaimer, the term of this patent is extended or adjusted under 35 U.S.C. 154(b) by 0 days.

(21) Appl. No.: 17/673,591

(22) Filed: Feb. 16, 2022

(65) Prior Publication Data
US 2022/0174024 A1    Jun. 2, 2022

Related U.S. Application Data

(63) Continuation of application No. 16/585,585, filed on Sep. 27, 2019, now abandoned.
(Continued)

(51) Int. Cl.
*H04L 47/78* (2022.01)
*H04L 47/80* (2022.01)
(Continued)

(52) U.S. Cl.
CPC ........ *H04L 47/781* (2013.01); *H04L 41/0816* (2013.01); *H04L 41/147* (2013.01);
(Continued)

(58) Field of Classification Search
CPC . H04L 41/08; H04L 41/0803; H04L 41/0813; H04L 41/0816; H04L 41/0876;
(Continued)

(56) References Cited

U.S. PATENT DOCUMENTS 7,225,250 B1    5/2007 Harrop
9,392,471 B1 *  7/2016 Thomas ............... H04L 41/147
(Continued)

FOREIGN PATENT DOCUMENTS

WO    2018005090 A1    1/2018

OTHER PUBLICATIONS

Kamamura, Shohei, et al. "Control and visualization system for managed self-organization network." 2011 7th International Conference on Network and Service Management. IEEE, 2011. (Year: 2011).*
(Continued)

*Primary Examiner* — Vivek Srivastava
*Assistant Examiner* — William C McBeth
(74) *Attorney, Agent, or Firm* — BCF LLP (57) ABSTRACT

Methods and systems for managing network resources enabling network services over a network and for managing maintenance of network resources. The method comprises determining a desired performance level for the network services, the desired performance level being associated with service metrics that establish compliance with a service level agreement; accessing internal data relating to operations of the network and external data not relating to operations of the network; generating a prediction of a network service pattern based on the desired performance level of the network services, the internal data and the external data; identifying a decision scenario for orchestration of the network resources, the decision scenario establishing a configuration of the network resources, the decision scenario being generated based on a correlation of the prediction of the network service pattern and availability of the network resources; and causing to adapt the network resources based on the decision scenario.

20 Claims, 7 Drawing Sheets

Related U.S. Application Data (60) Provisional application No. 62/738,685, filed on Sep. 28, 2018.

(51) Int. Cl.
*H04L 47/70* (2022.01)
*H04L 41/147* (2022.01)
*H04L 41/5025* (2022.01)
*H04L 41/0816* (2022.01)
*H04L 41/16* (2022.01)

(52) U.S. Cl.
CPC .......... *H04L 41/16* (2013.01); *H04L 41/5025* (2013.01); *H04L 47/801* (2013.01); *H04L 47/808* (2013.01); *H04L 47/822* (2013.01); *H04L 47/823* (2013.01)

(58) Field of Classification Search
CPC ..... H04L 41/0886; H04L 41/12; H04L 41/14; H04L 41/142; H04L 41/145; H04L 41/147; H04L 41/149; H04L 41/16; H04L 41/50; H04L 41/5003; H04L 41/5009; H04L 41/5019; H04L 41/5025; H04L 47/781; H04L 47/788; H04L 47/805; H04L 47/808; H04L 47/822; H04L 47/823
See application file for complete search history.

(56) References Cited

U.S. PATENT DOCUMENTS

| | | |
|---|---|---|
| 9,853,914 B1 | 12/2017 | Felstaine et al. |
| 2005/0265321 A1 | 12/2005 | Rappaport et al. |
| 2007/0121509 A1 | 5/2007 | Taylor et al. |
| 2009/0222540 A1 | 9/2009 | Mishra et al. |
| 2012/0131172 A1* | 5/2012 | Falk .................. H04L 41/5009 709/224 |
| 2012/0131594 A1 | 5/2012 | Morgan |
| 2013/0031424 A1 | 1/2013 | Srivastava et al. |
| 2015/0195149 A1 | 7/2015 | Vasseur et al. |
| 2015/0363240 A1 | 12/2015 | Koizumi |
| 2016/0057075 A1 | 2/2016 | Parikh et al. |
| 2016/0301624 A1 | 10/2016 | Gonzalez et al. |
| 2016/0353268 A1* | 12/2016 | Senarath .............. H04L 47/805 |
| 2017/0054641 A1 | 2/2017 | Anerousis et al. |
| 2017/0127427 A1 | 5/2017 | Claridge et al. |
| 2017/0141967 A1* | 5/2017 | Chawla ................. H04L 41/147 |
| 2017/0207981 A1 | 7/2017 | Maguire et al. |
| 2017/0230267 A1 | 8/2017 | Armolavicius et al. |
| 2017/0244614 A1* | 8/2017 | Wu ...................... H04L 47/762 |
| 2017/0257304 A1 | 9/2017 | Shah et al. |
| 2017/0353361 A1 | 12/2017 | Chopra et al. |
| 2018/0063002 A1 | 3/2018 | Filley |
| 2019/0140918 A1* | 5/2019 | Xu ........................ H04L 47/823 |
| 2019/0280918 A1 | 9/2019 | Hermoni et al. |
| 2019/0319881 A1 | 10/2019 | Maskara et al. |
| 2019/0379592 A1* | 12/2019 | Samadi ................. H04L 41/145 |
| 2020/0136975 A1 | 4/2020 | Arora et al. |
| 2021/0014123 A1* | 1/2021 | Glover ................. H04L 41/142 |

OTHER PUBLICATIONS

Muñoz, Pablo, Oriol Sallent, and Jordi Pérez-Romero. "Capacity self-planning in small cell multi-tenant 5G networks." 2017 IFIP/IEEE Symposium on Integrated Network and Service Management (IM). IEEE, 2017. (Year: 2017).*

Martin, Angel, et al. "Network resource allocation system for QoE-aware delivery of media services in 5G networks." IEEE Transactions on Broadcasting 64.2 (2018): 561-574. (Year: 2018).*

Zhang et al., "Base station and service social network and its application in cellular networks", ResearchGate, http://engine.scichina.com/doi/10.1360/N112017-00045, 2017, 19 pages.

J. Barron, M. Crotty, E. Elahi, R. Riggio, D. R. Lopez and M. P. de Lean, "Towards self-adaptive network management for a recursive network architecture," NOMS 2016—2016 IEEE/IFIP Network Operations and Management Symposium, 2016, pp. 1143-1148 (Year: 2016).

A. Chigurupati, R. Thibaux and N. Lassar, "Predicting hardware failure using machine learning," 2016 Annuai Reliability and Maintainability Symposium (RAMS), 2016, pp. 1-6 (Year: 2016).

"Imminent," The Cambridge English Dictionary, Cambridge University Press, <https://dictionary.cambridge.org/us/dictionary/english/ imminent>, Accessed Nov. 9, 2021 (Year: 2021).

T. S. Buda et al., "Can machine learning aid in delivering new use cases and scenarios in 5G?," NOMS 2016—2016 IEEE/IFIP Network Operations and Management Symposium, 2016, pp. 1279-1284 (Year: 2016).

Zhang, Sheng, et al. "Traffic prediction based power saving in cellular networks: A machine learning method." Proceedings of the 25th ACM SIGSPATIAL international conference on advances in geographic information systems. 2017. (Year: 2017).

A. Antonescu, A. Gomes, P. Robinson and T. Braun, "SLA-driven predictive orchestration for distributed cloud-based mobile services," 2013 IEEE International Conference on Communications Workshops (ICC), Budapest, 2013, pp. 738-743 (Year: 2013).

B. Frogner and A. B. Cannara, "Monitoring and prediction of network performance," Proceedings of International Workshop on Advance Issues of E-Commerce and Web-Based Information Systems. (Cat. No.PR00334), Santa Clara, CA, USA, 1999, pp. 122-129 (Year: 1999).

* cited by examiner

SYSTEM AND METHOD FOR MANAGING NETWORK RESOURCES

CROSS-REFERENCE

The present application is a continuation of U.S. patent application Ser. No. 16/585,585, filed Sep. 27, 2019, and claims convention priority to U.S. Provisional Patent Application No. 62/738,685, filed Sep. 28, 2018, the disclosures of both of which are incorporated by reference herein in their entirety.

FIELD

The present technology relates to systems and methods for managing network resources. In particular, the systems and methods allow network resource orchestration and/or network resource maintenance.

BACKGROUND

Network service providers typically implement and manage physical network architecture components (i.e., network hardware resources) to deploy network functions. Such network hardware resources may comprise, without being limitative, antennas, routers, storages, switches, servers, gateways. The network hardware resources typically operate in accordance with one or more protocols so as to ensure proper communication amongst the network hardware resources. Network functions are traditionally deployed as physical devices running software components that are tightly coupled to the physical devices. Such approach to network functions creates operational challenges as manual interventions are often required to upscale or downscale network resources thereby preventing fast deployment of new network functions.

In order to address at least some of these issues, network service providers have turned to network virtual resources allowing operating virtualized network functions decoupled for the underlying hardware. The network virtual resources may rely on one or more virtual machines running software on top the physical network architecture as opposed to requiring dedicated network hardware devices for each network functions. As a result, if determination is made that additional network resources are required in an area and/or at a given moment in time, new network resources may be rapidly deployed with no or little manual interventions. As an example, an orchestration layer may deploy one or more virtual machines to add capacity to the network.

Increase and/or decrease in network resource capacity is often reactive in nature and contingent upon arriving at some trigger point (e.g., a measurement that a network resource operates beyond its limits, loss of network functionality in part or whole). Such reactive increase and/or decrease in network resource capacity may present challenges in rendering optimal network service delivery, in particular in contexts wherein the network resources support a plurality of network applications (e.g., high throughput data consumer communications, low latency automotive connectivity, multiple heterogeneous connected devices) in dynamic time varying environments.

Therefore, even though the recent developments identified above may provide benefits, improvements are still desirable.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches.

SUMMARY

Embodiments of the present technology have been developed based on developers' appreciation of shortcomings associated with the prior art.

In particular, such shortcomings may comprise (1) a reactive approach to increase and/or decrease in network resource capacity deployment, as opposed to a proactive approach; and (2) silos between various data sources based on which increase and/or decrease in network resource capacity deployment may be determined, thereby limiting an ability to implement a proactive approach.

In one aspect, various implementations of the present technology provide a method for managing network resources enabling network services over a network, the method comprising:
  determining a desired performance level for the network services, the desired performance level being associated with service metrics that establish compliance with a service level agreement;
  accessing internal data relating to operations of the network and external data not relating to operations of the network;
  generating a prediction of a network service pattern based on the desired performance level of the network services, the internal data and the external data;
  identifying a decision scenario for orchestration of the network resources, the decision scenario establishing a configuration of the network resources, the decision scenario being generated based on a correlation of the prediction of the network service pattern and availability of the network resources; and
  causing to adapt the network resources based on the decision scenario.

In other aspects, various implementations of the present technology provide a method for managing maintenance of network resources, the method comprising:
  accessing internal data relating to operations of the network and external data not relating to operations of the network;
  generating maintenance actions to be conducted on the network resources based on the internal data and the external data; and
  generating planning of the maintenance actions.

In other aspects, various implementations of the present technology provide a non-transitory computer-readable medium storing program instructions for executing methods of managing network resources, the program instructions being executable by a processor of a computer-based system to carry out one or more of the above-recited methods.

In other aspects, various implementations of the present technology provide a computer-based system, such as, for example, but without being limitative, an electronic device comprising at least one processor and a memory storing program instructions for executing methods of managing network resources, the program instructions being executable by the at least one processor of the electronic device to carry out one or more of the above-recited methods.

In the context of the present specification, unless expressly provided otherwise, a computer system may refer, but is not limited to, an "electronic device", an "operation system", a "system", a "computer-based system", a "network system", a "network device", a "controller unit", a "monitoring device", a "control device" and/or any combination thereof appropriate to the relevant task at hand.

In the context of the present specification, unless expressly provided otherwise, the expression "computer-readable medium" and "memory" are intended to include media of any nature and kind whatsoever, non-limiting examples of which include RAM, ROM, disks (CD-ROMs, DVDs, floppy disks, hard disk drives, etc.), USB keys, flash memory cards, solid state-drives, and tape drives. Still in the context of the present specification, "a" computer-readable medium and "the" computer-readable medium should not be construed as being the same computer-readable medium. To the contrary, and whenever appropriate, "a" computer-readable medium and "the" computer-readable medium may also be construed as a first computer-readable medium and a second computer-readable medium.

In the context of the present specification, unless expressly provided otherwise, the words "first", "second", "third", etc. have been used as adjectives only for the purpose of allowing for distinction between the nouns that they modify from one another, and not for the purpose of describing any particular relationship between those nouns.

Implementations of the present technology each have at least one of the above-mentioned objects and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

It should also be noted that, unless otherwise explicitly specified herein, the drawings are not to scale.

DETAILED DESCRIPTION

The examples and conditional language recited herein are principally intended to aid the reader in understanding the principles of the present technology and not to limit its scope to such specifically recited examples and conditions. It will be appreciated that those skilled in the art may devise various arrangements which, although not explicitly described or shown herein, nonetheless embody the principles of the present technology and are included within its spirit and scope.

Furthermore, as an aid to understanding, the following description may describe relatively simplified implementations of the present technology. As persons skilled in the art would understand, various implementations of the present technology may be of a greater complexity.

In some cases, what are believed to be helpful examples of modifications to the present technology may also be set forth. This is done merely as an aid to understanding, and, again, not to define the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

Moreover, all statements herein reciting principles, aspects, and implementations of the present technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, pseudo-code, and the like represent various processes which may be substantially represented in computer-readable media and so executed by a computer or processor, whether or not such computer or processor is explicitly shown.

The functions of the various elements shown in the figures, including any functional block labeled as a "processor", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. In some embodiments of the present technology, the processor may be a general purpose processor, such as a central processing unit (CPU) or a processor dedicated to a specific purpose, such as a digital signal processor (DSP). Moreover, explicit use of the term a "processor" should not be construed to refer exclusively to hardware capable of executing software, and may implicitly include, without limitation, application specific integrated circuit (ASIC), field programmable gate array (FPGA), read-only memory (ROM) for storing software, random access memory (RAM), and non-volatile storage. Other hardware, conventional and/or custom, may also be included.

Software modules, or simply modules which are implied to be software, may be represented herein as any combination of flowchart elements or other elements indicating performance of process steps and/or textual description. Such modules may be executed by hardware that is expressly or implicitly shown. Moreover, it should be understood that module may include for example, but without being limitative, computer program logic, computer program instructions, software, stack, firmware, hardware circuitry or a combination thereof which provides the required capabilities.

With these fundamentals in place, we will now consider some non-limiting examples to illustrate various implementations of aspects of the present technology.

Figure 1:
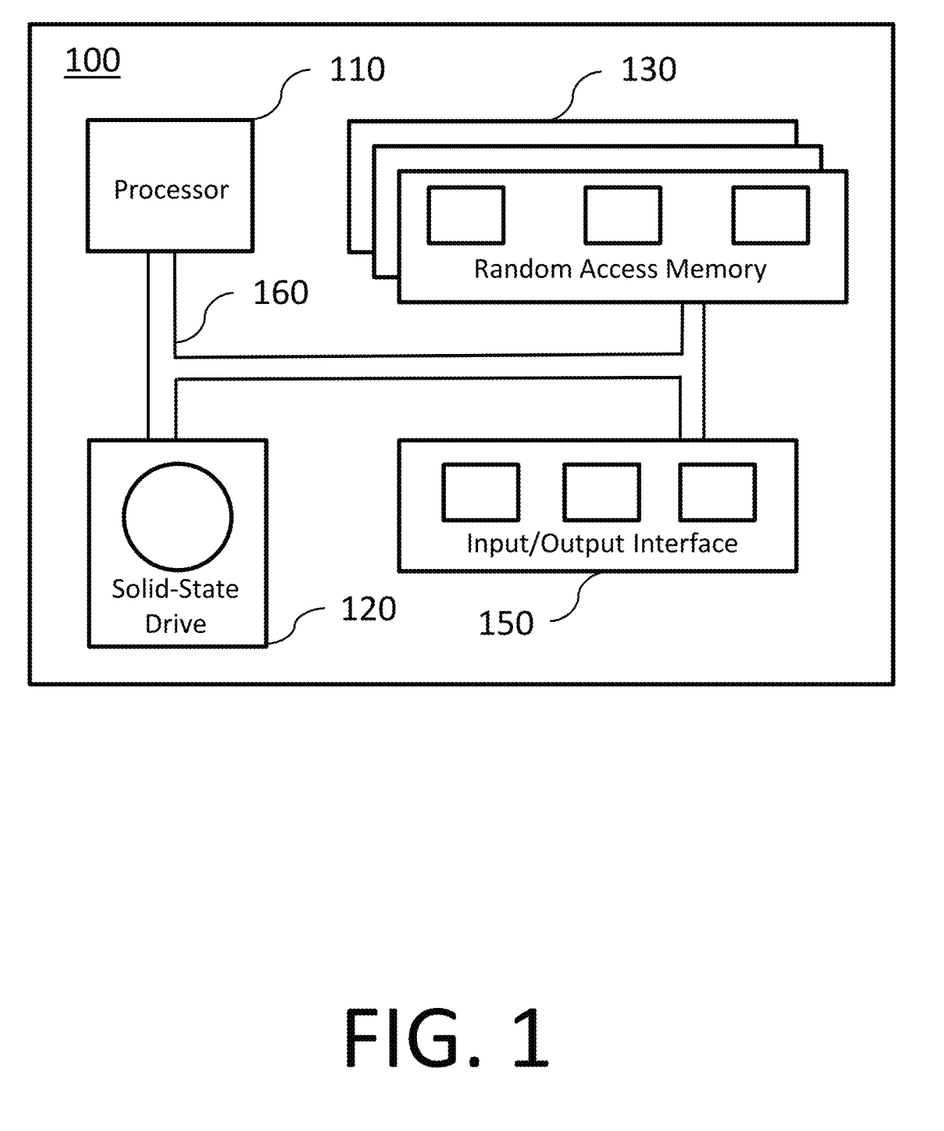
FIG. 1 is a diagram of a computing environment in accordance with an embodiment of the present technology.

FIG. 1 illustrates a diagram of a computing environment 100 in accordance with an embodiment of the present technology is shown. In some embodiments, the computing environment 100 may be implemented by any of a conventional personal computer, a computer dedicated to managing network resources, a network device and/or an electronic device (such as, but not limited to, a mobile device, a tablet device, a server, a controller unit, a control device, etc.) and/or any combination thereof appropriate to the relevant task at hand. In some embodiments, the computing environment 100 comprises various hardware components including one or more single or multi-core processors collectively represented by a processor 110, a solid-state drive 120, a random access memory 130 and an input/output interface 150. The computing environment 100 may be a computer specifically designed for managing network resources. In some alternative embodiments, the computing environment 100 may be a generic computer system.

In some embodiments, the computing environment 100 may also be a sub-system of one of the above-listed systems. In some other embodiments, the computing environment 100 may be an "off the shelf" generic computer system. In some embodiments, the computing environment 100 may also be distributed amongst multiple systems. The computing environment 100 may also be specifically dedicated to the implementation of the present technology. As a person in the art of the present technology may appreciate, multiple variations as to how the computing environment 100 is implemented may be envisioned without departing from the scope of the present technology.

Communication between the various components of the computing environment 100 may be enabled by one or more internal and/or external buses 160 (e.g. a PCI bus, universal serial bus, IEEE 1394 "Firewire" bus, SCSI bus, Serial-ATA bus, ARINC bus, etc.), to which the various hardware components are electronically coupled.

The input/output interface 150 may allow enabling networking capabilities such as wire or wireless access. As an example, the input/output interface 150 may comprise a networking interface such as, but not limited to, a network port, a network socket, a network interface controller and the like. Multiple examples of how the networking interface may be implemented will become apparent to the person skilled in the art of the present technology. For example, but without being limitative, the networking interface may implement specific physical layer and data link layer standard such as Ethernet, Fibre Channel, Wi-Fi, Token Ring or Serial communication protocols. The specific physical layer and the data link layer may provide a base for a full network protocol stack, allowing communication among small groups of computers on the same local area network (LAN) and large-scale network communications through routable protocols, such as Internet Protocol (IP).

According to implementations of the present technology, the solid-state drive 120 stores program instructions suitable for being loaded into the random access memory 130 and executed by the processor 110 for executing managing network resources. For example, the program instructions may be part of a library or an application.

Figure 2:
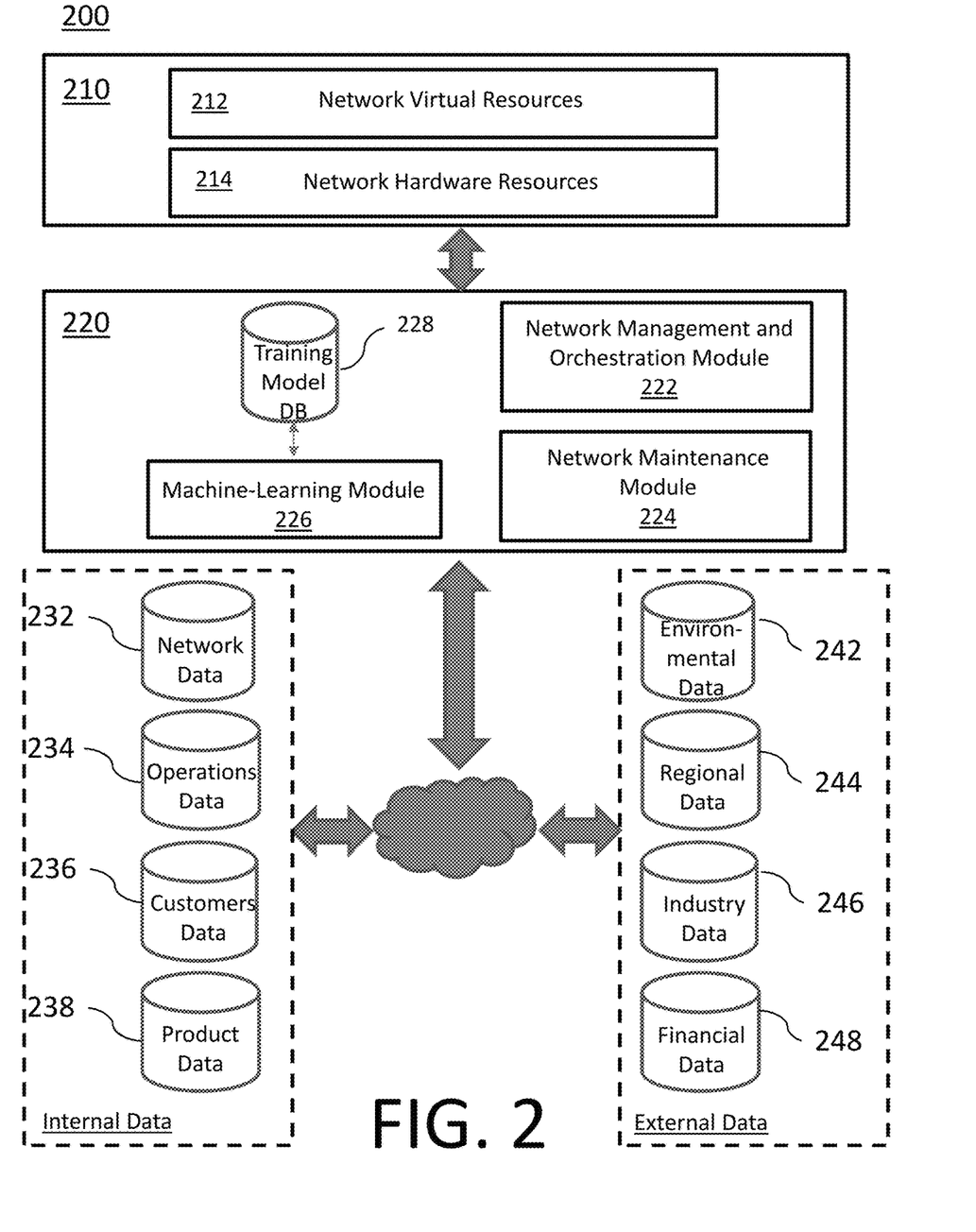
FIG. 2 is a diagram of a network service provider environment in accordance with an embodiment of the present technology.

Referring to FIG. 2, a network service provider environment 200 is depicted. The network service provider environment 200 comprises network resources 210 and a network resource management tool 220. The network resource management tool 220 may monitor and/or control the network resources 210 via a communication channel, such as, the Internet and/or via an intranet implemented as part of the network architecture. The network resource management tool 220 may also access internal data and external data via the Internet and/or an intranet.

In some embodiments, the network resources 210 comprise network hardware resources 212 which may comprise, without being limitative, antennas, routers, storages, switches, servers, gateways and/or physical cabling (e.g., optic fiber lines, copper cables). In some embodiments, the physical cabling may embody multi-frequency cables allowing additional wavelengths to be enabled as communication channels using specific paths to optimize capacity and/or resources in the "backhaul" network. The network resources 210 may also comprise a virtualization layer which is enabled by network virtual resources 212. The network virtual resources 212 operate virtualized network functions such as, but not limited to, virtual compute resources, virtual storage resources and/or virtual communication channels. The virtualized network functions may comprise one or more virtual machines running different software and processes on top of the network hardware resources 214. A virtual machine may be an operating system or application environment that is installed on software which imitates dedicated hardware. Specialized software, also referred to as hypervisor may emulate a CPU, memory, hard disk, network and/or other hardware resources which allows the virtual machines to share the network hardware resources 214. In some embodiments, the virtualized network functions may be pre-defined functional behavior within a network, such as, but without being limitative, firewalling, domain name service (DNS), caching, network address translation (NAT), operating a proxy interface that may convert cellular packets (e.g., Access Point Name (APN) protocol) into IP packets, etc. Individual virtualized network functions may be linked or chained in a way similar to building blocks to offer a full-scale networking communication services (also referred to as network applications).

In some embodiments, the network resources 210 may support a plurality of network services which needs for network resources may vary in time and/or geography. The networking services may happen to be competing amongst one another for network resources. The network services may comprise services with different priority needs, such as, but without being limitative, speed, timeliness, accuracy and/or a combination thereof. For example, network services may include, without being limitative, high throughput data consumer communications, low latency automotive connectivity (i.e., near real time connectivity), multiple heterogeneous connected devices. Other examples will become apparent to the person skilled in the art of the present technology. Each one of the network services may be associated with one or more Service Level Agreements (SLA) and service metrics. SLA may be interpreted as a commitment between a network service provider and a service user. Particular aspects of the service—quality, service level, availability and/or responsibilities may be agreed upon between the network service provider and the service user. In order to implement such agreement, service metrics may be defined and monitored so as to measure one or more performances parameters of the network services and take measures regarding allocation of network resources. Such service metrics may comprise, without being limitative, a latency, available upload/download bandwidths, network uptimes, number of devices connected at a same time, etc. The service metrics therefore allows defining and monitoring a service level for a given network.

In some embodiments, the network resource management tool 220 may comprise a network management and orchestration module 222, a network maintenance module 224 and a machine-learning module 226 associated with a training model database 228. In some embodiments, the network management and orchestration module 222 enables automation and provisional tasks relating to the network resources 210. The tasks of orchestration may include configuration and execution of virtualized network functions so as to adapt the network hardware resources 214 and/or the network virtual resources 212 so as to properly support one or more network services (for example, so as to ensure that a given network service meets requirements of an associated SLA). In some embodiments, the tasks of orchestration may include provisioning of virtual machines and application instances, security and compliance assessment, monitoring and/or reporting. As further detailed in connection with the description of FIG. 3, the network management and orchestration module 222 may operate predictive auto-scaling to scale-up or scale-down the network resources 210. In some embodiments, this may comprise scaling-up or scaling-down virtualized network functions enabling the network virtual resources 212.

In some embodiments, the network management and orchestration module 222 may complement an existing management and orchestration tool operated by a network service provider so as to optimize, improve and/or adjust service delivery to customers. In some embodiments, such a balance may be determined in line with SLA and/or overall demand. As an example, but without being limitative, a network service may be scaled down to a minimum acceptable service on one end in order to supply acceptable network service on another end. The network management and orchestration module 222 may proactively (as opposed to reactively) adapt and shape capabilities of the network resources 210 (the network hardware resources 214 and/or the network virtual resources 212). The network management and orchestration module 222 may further allow delivering contextual, tailored network service levels by leveraging existing or future network infrastructures such as the network virtual resources 212 and/or the network hardware resources 214. In some embodiments, the network management and orchestration module 222 may operate as a supervision layer on top of existing network management tools. In some embodiments, the network management and orchestration module 222 may monitor the one or more network services enabled by the network resource 210. The network management and orchestration module 222 may predict network service degradation, for example, but without being limitative, due to external events (e.g., entertainment events, disaster, road traffic, weather conditions) and may adapt the network resources 210 accordingly. In some embodiments, predictions of network service degradation may be based on external data processed by the machine-learning module 226, as it will be further detailed in the subsequent paragraphs. Tasks executed by the network management and orchestration module 222 may be based on a pro-active and predictive basis resulting in a preventive (as opposed to curative) approach to management of network resources. In some embodiments, the network management and orchestration module 222 may also be combined with self-healing, configuration and optimization solutions so as to create new instances of virtual devices or services to handle expected increases in network traffic, or disable a specific virtual or physical network resource, when imminent failure is expected. Operations of the network management and orchestration module 222 may allow improving network service customer experience while improving efficiency of the network resource usage by providing network resource usage optimization, anomaly detection, network operations management, detection of irregular operations and/or disaster recovery.

In some embodiments, the network maintenance module 224 may rely on the machine-learning module 226 and the internal data and/or external data to, at least partially, automate routing, planning, scheduling and/or execution of tasks to support operations of the network resources 210. In some embodiments, the network maintenance module 224 may execute maintenance operations in real-time. In some embodiments, the network maintenance module 224 may leverage multiple data sources (e.g., internal data and/or external data) and/or manual processes (e.g., in person verification, scanning or photography of physical integrity of hardware infrastructure by maintenance staff) to enable systemic business operations and/or decision-making agent such as, but not limited to, predictive maintenance of the network resources 210 (e.g., so as to determine proactively if specific maintenance operations are required on certain network resources). In some embodiments, the network maintenance module 224 comprise an image recognition module allowing to detect and/or predict cell tower and equipment corrosion rust or physical degradation. In some embodiments, the network maintenance module 224 may adaptively and/or nimbly impact field operation maintenance activities by improving workforce scheduling, planning and/or dispatching fleets, at least partially, automatically based on internal data and/or external data (e.g., aggregated contextual customer complaints in a geographic area). The network maintenance module 224 may therefore allow improved management of assets such as, the network hardware resources 214 and improve their longevity. Further benefits may comprise improving network customer satisfaction, improved experience by accelerating ticket resolution, decreasing operational costs and/or time to repair network resources. In some embodiments, the network maintenance module 224 may enable monitoring physical hardware components for failure, identifying quality of service or performance degradations, notifying system support teams of existing problems, scheduling reactive or proactive network maintenance, field workforce scheduling, disaster recovery (improved maintenance dispatching) and/or field troubleshooting support (contextual and/or dynamic). In some embodiments, the network maintenance module 224 may also enable management of activity related to irregular operation situations (IROPS).

In some embodiments, the machine-learning module 226 may access, use and/or process external data, internal data and/or a training model database 228 as factors in a decision and/or inference process. In some embodiments, the machine-learning module 226 may be part of the network management and orchestration module 222 and/or the network maintenance module 224. In alternative embodiments, the machine-learning module 226 may be a distinct and/or autonomous software component exchanging data with the network management and orchestration module 222 and/or the network maintenance module 224 via an interface, e.g., an Application Programming Interface (API). In some embodiments, the machine-learning module 226 may implement one or more machine-learning algorithm so as to leverage internal data and/or external data with existing training models from the training model database 228.

Examples of machine-learning algorithms implemented by the machine-learning module 228 may comprise, without being limitative, non-linear algorithm, linear regression, logistic regression, decision tree, support vector machine, naïve bayes, K-nearest neighbors, K-means, random forest, dimensionality reduction, neural network, gradient boosting, adaboost, lasso, elastic net, ridge, bayesian ridge, Automatic Relevance Determination (ARD) regression, Stochastic Gradient Descent (SGD) regressor, passive aggressive regressor, k-neighbors regressor and/or Support Vector Regression (SVR). In some embodiments, the training model database 228 may be implemented through database services such as, without being limitative, MySQL, PostgreSQL, MongoDB, MariaDB, Microsoft SQL Server, Oracle, Sybase, SAP HANA, MemSQL and/or IBM DB2. In some embodiments, machine-learning module 226 may continuously run algorithm training instances so as to improve efficiency of algorithms for a given set of network resources.

As previously explained, the network resource management tool 220, the network management and orchestration module 222, the network maintenance module 224 and/or the machine-learning module 226 may access internal data and/or external data. In some embodiments, internal data may comprise data only accessible by the network service provider, created and compiled by the network service provider as a result of operating the network. In contrast, external data may comprise data accessible from sources external to the network service provider and may exclude data relating to the operations of the network. Such external data are not directly related to the operations of the network. Both the internal data and the external data may be in structured or unstructured formats. Both the internal data and the external data may be stored in one or more databases and/or directly collected from various sources (either in real-time or at predefined intervals) such as, without being limitative, sensors, collectors and/or data feeds. In some embodiments, internal data may be collected from central network resources and/or from resources distributed across the network (e.g., data collected at edges and/or nodes of the network). In some embodiments, processing of the internal data may be centralised and/or decentralised (i.e., edge computing). In some embodiments, the internal data may also relate to performances and/or configuration of network resources. Multiple approaches may therefore be envisioned as to how internal data an external data may be collected and/or compiled without departing from the scope of the present technology.

In some embodiments, the internal data may comprise, for example, but without being limitative, network data 232, operations data 234, customers data 236 and product data 238. The network data 232 may comprise data generated as a result of operating the network, for example, but without being limitative, data collected from network probes (radio and core, transport and access), field measurements, geocoded live data from network devices and/or other data sources. The network data 232 may also comprise data collected from quality assurance tools, country-wide, regional and local supervision platforms and/or network management and monitoring tools available from vendors of network equipment.

The operations data 234 may comprise business data resulting from business operations associated with the network, for example, but without being limitative, financial quarterly earnings, Capital Expenditure (CAPEX), market trends and/or other data sources.

The customers data 236 may comprise data relating to customer usage of the service. Such data may be anonymized before being further process by the network management tool 220 to ensure compliance with existing and future regulations relating to data privacy. As an example, but without being limitative, the customers data 236 may comprise historical interactions, account details, social media and news feeds and/or other data sources. In some embodiments, the customers data 236 may also comprise subscriber data and customer care/call center data. In some embodiments, the customers data 236 may also comprise customer experience systems of records, such as, but without being limitative, Customer Relationship Management (CRM) tools, SLA compliance tools and/or contextual data (e.g., subscriber/customer historical experience profile). As an example, but without being limitative, the subscriber data may comprise account details (plan, statements, payments, fees, roaming, customer segment, services), demographic and/or location. As an example, but without being limitative, the customer care/call center data may comprise historical interactions, sentiment and/or device details and issues. In some embodiments, collected data may be geotagged with a customer location at time of request for geographic optimization purposes. Collected data may be anonymized and/or aggregated so as to obfuscate individual information and ensure compliance with privacy regulations.

The product data 238 may comprise, without being limitative, Product Offering Services (POS) data, device details and issues, location and/or other data sources.

In some embodiments, the external data may comprise, for example, but without being limitative, environmental data 242, regional data 244, industry data 246 and/or financial data 248. Environmental data 242 may comprise, as an example, but without being limitative, weather data, natural disaster information, geo-political information and/or seasonal trend information. Regional data 244 may comprise, as an example, but without being limitative data relating to traffic, local events (music, sports, festivals), public transportation and/or ad placement. The industry data 246 and the financial data 248 may comprise, as an example, but without being limitative, data relating to competitor information, partner information (e.g., roaming partnership and/or terms thereof), promotional, related product trends and information and/or cross-currency.

Figure 3:
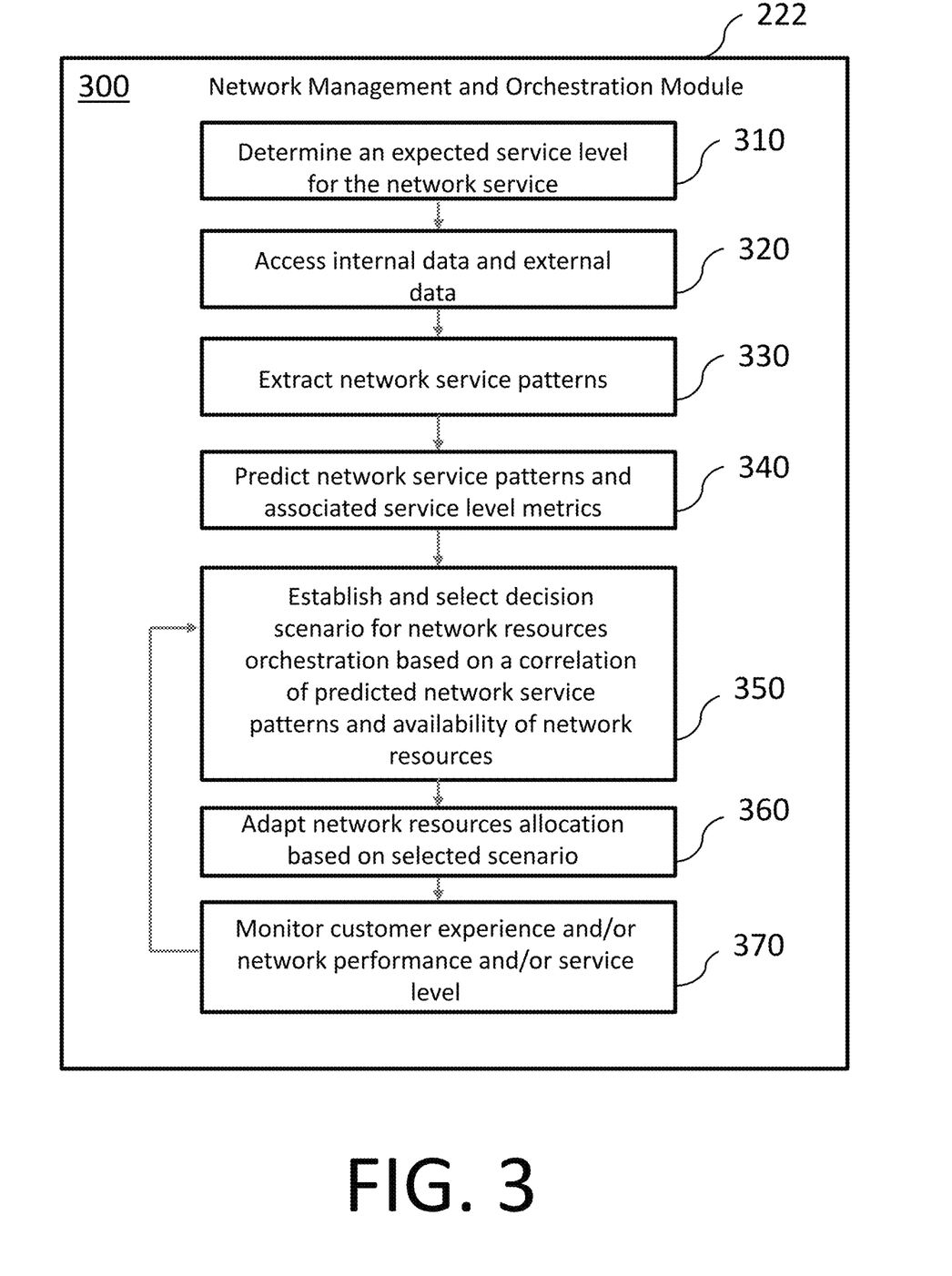
FIG. 3 is a diagram illustrating a network management and orchestration module in accordance with an embodiment of the present technology.

An exemplary embodiment of the network management and orchestration module 222 is exemplified in FIG. 3. In this embodiment, the network management and orchestration module 222 is configured to execute various steps of a method 300 allowing an improved delivery of network services while improving usage of network resources. In some embodiments, the network management and orchestration module 222 causes to execute the machine-learning module 226 which may be part of the network management and orchestration module 222 or operate as a distinct software component (e.g., so as to operate for both the network management and orchestration module 222 and the network maintenance module 224). Multiple variations as to how and where the machine-learning module 226 may be implemented may therefore be envisioned without departing from the scope of the present technology.

At a step 310, the network management and orchestration module 222 may determine an expected level of network services for the network or a portion of the network. As an example, determination may be made that multiple network services have to operate on the network and therefore share the network resources 210. Each one of the network services may be associated with certain service metrics that establish network performances to be matched to ensure SLA compliance of each one of the network services. In some embodiments, the network management and orchestration module 222 may detect that a network service operate outside of normal reasonable historical parameters without a significant observable change in the overall architecture of the network.

At a step 320, the network management and orchestration module 222 may access internal data and external data. In some embodiments, a distinct software module may undertake to access the internal data and the external data. At a step 330, network service patterns are extracted based on the internal data, the external data and the expected level of network services. In some embodiments, the step 330 may comprise determining a physical and/or organization of a network into groups (e.g., cells) where radio communication of a given cell is managed exclusively by one or multiple radio base stations. In some embodiments, the network service pattern may be associated with one or more of a local area, a regional area and/or a country-wide area. In some embodiments, the step 330 also comprises characterizing the network service patterns. In some embodiments, characterizing the network service pattern allows augmenting the network service organization data with information relating to, for example, but without being limitative, performance and utilization of each cell and radio tower, and/or how such performance and utilization evolve over time.

At a step 340, predictions of network service patterns and/or associated service level metrics may be generated, for example, by the machine-learning module 226. In some embodiments, the machine-learning module 226 may be trained with historical network service pattern data which enables prediction of imminent system or component failures (or degradation without failure) based on current network service pattern data.

At a step 350, decision scenarios are established for network resources orchestration and one or more decision scenarios are selected. In some embodiments, establishment and/or selection of decision scenarios may be based on correlations of the predicted network service patterns and availability of network resources. In some embodiments, the correlations are identified and mapped on a graph. In some embodiments, the availability of network resources may relate to computing power at the core and/or at the edge of the network, storage at a local base station/node, storage at a central network equipment and/or availability of frequency bands, channels and/or a number of active nodes per channel/band (i.e., concentration).

At a step 360, network resources are allocated in accordance with the one or more selected decision scenarios, for example, by conducting orchestration tasks resulting in scaling-up certain virtual network functions and/or scaling down other virtual network functions. In some embodiments, the selected decision scenarios is not limited to adapting the network to one network service in particular but rather establish an holistic decision scenario allowing to implement appropriate arbitration between network services running in parallel and competing to share the same network resources. In some embodiments, step 360 may comprise re-arranging a layout of the network. As an example, in a wireless network wherein overlaps exist, it may be envisioned to tune down a tower and tune up another tower thereby changing a covered area/population on the fly so as to distribute resources more evenly.

At a step 370, a loop back mechanism may execute monitoring customer experience, network performance and/or network service level and influence modifications of a decision scenario which in turn results in further adapting the network resources so as to base orchestration of the network resources both on predictions and actual/real-life feedback. In some embodiments, the step 370 may further comprise monitoring customer experience, network performance and/or network service level so as to detect abnormal or unusual network behaviour and customer experience. In some embodiments, the monitored customer experience, network performance and/or network service level are fed to the machine-learning module 226 so as to reinforce the one or more trained models based on actual/real-life responses to network resources rebalancing operations.

In some embodiments, the method 300 may also be used to anticipate network service disruptions (or significant changes in concentration distribution across the network resources) and adapt the network resources accordingly.

Figure 4:
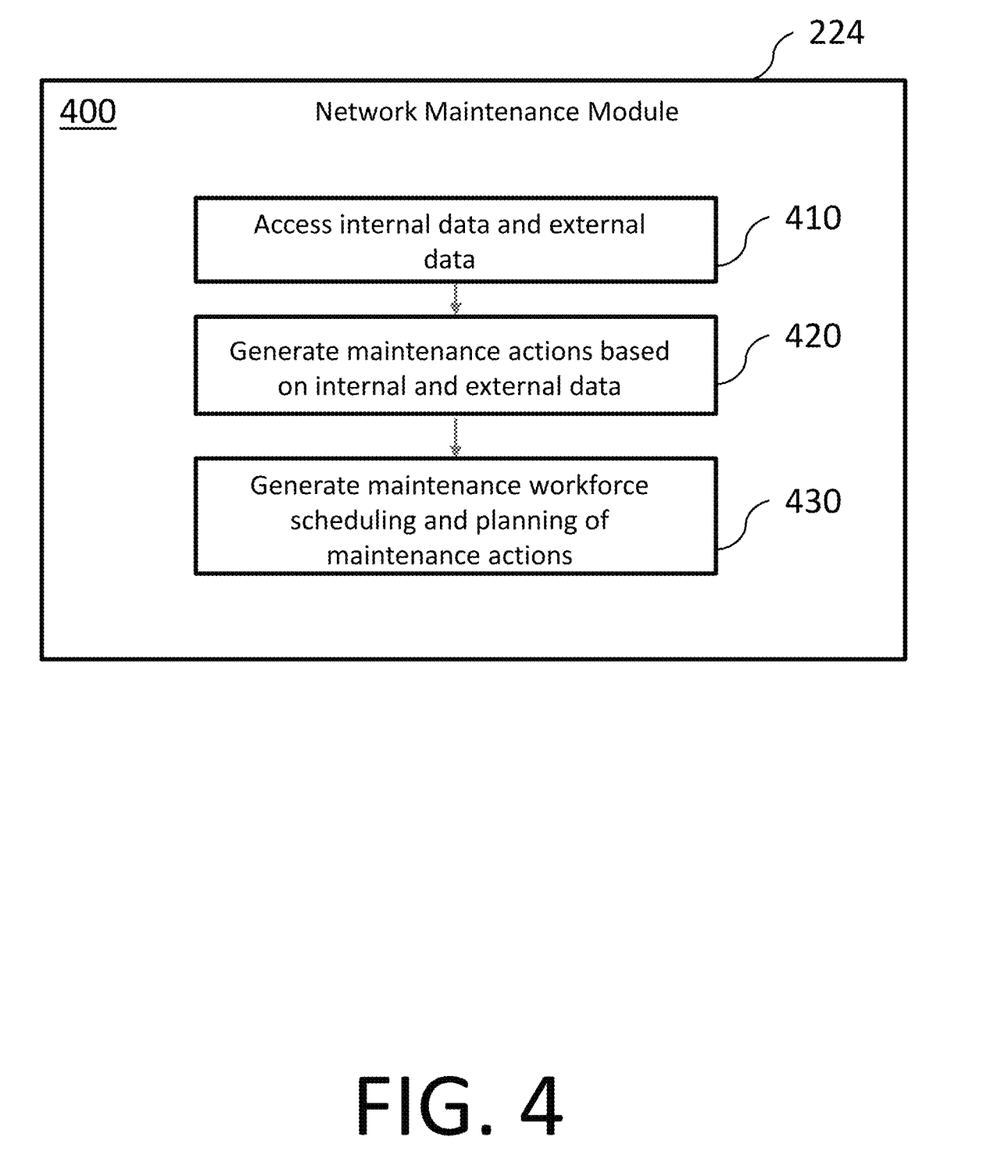
FIG. 4 is a diagram illustrating a network maintenance module in accordance with an embodiment of the present technology.

An exemplary embodiment of the network maintenance module 224 is exemplified in FIG. 4. In this embodiment, the network maintenance module 224 is configured to execute various steps of a method 400 allowing automating, at least partially, routing, planning, scheduling and/or execution of tasks to support operations of network resources. In some embodiments, the network maintenance module 224 causes to execute the machine-learning module 226 which may be part of the network maintenance module 224 or operate as a distinct software component (e.g., so as to operate for both the network management and orchestration module 222 and the network maintenance module 224). Multiple variations as to how and where the machine-learning module 226 may be therefore envisioned without departing from the scope of the present technology.

At a step 410, the network maintenance module 224 may access internal data and external data. In some embodiments, a distinct software module may undertake to access the internal data and the external data. At a step 420, the network maintenance module 224, based on the internal data and the external data, generate maintenance actions relating to the network resources. At a step 430, the maintenance workforce scheduling and planning of maintenance actions may be generated and executed.

Figure 5:
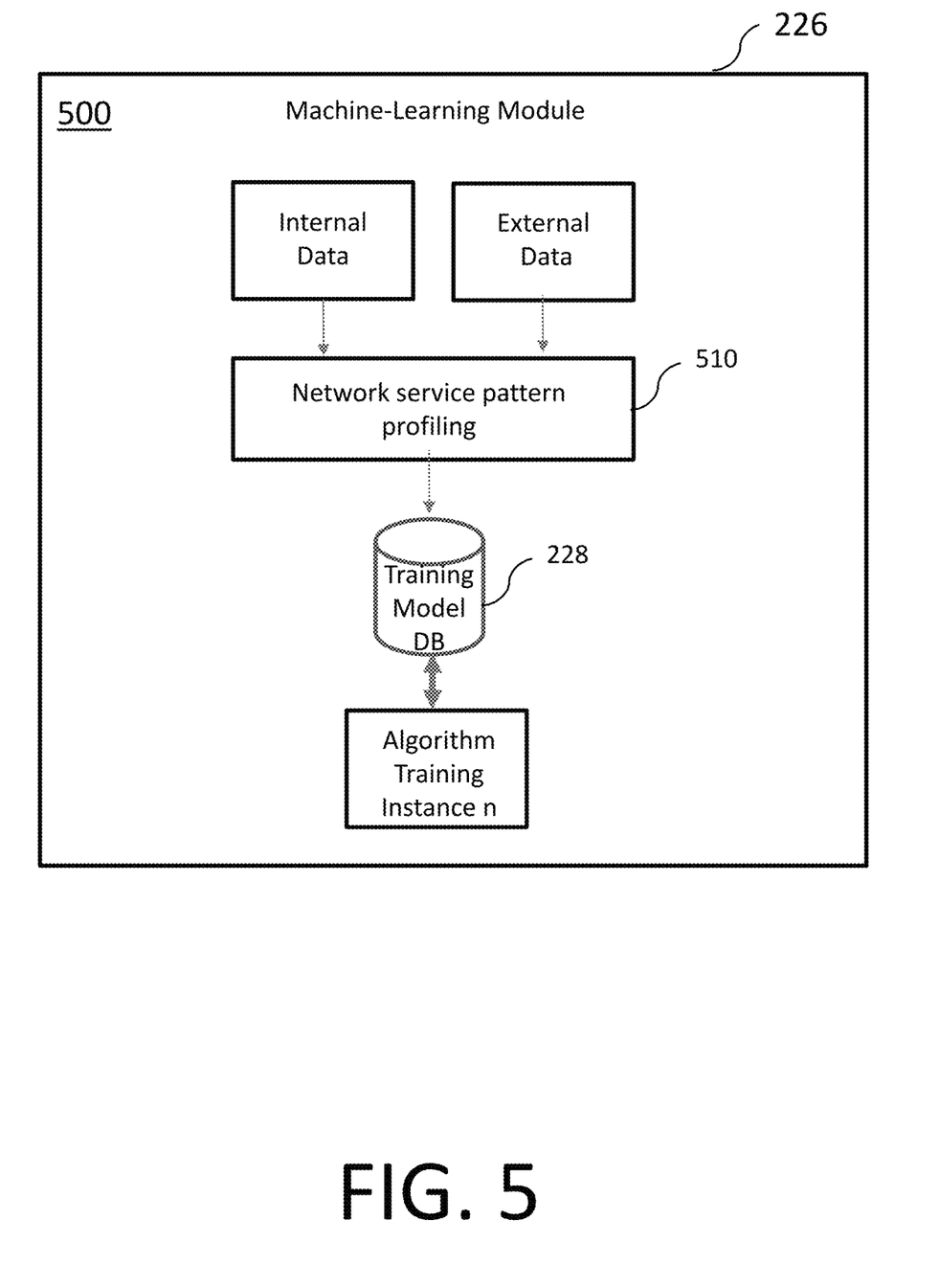
FIG. 5 is a diagram illustrating a machine-learning module in accordance with an embodiment of the present technology.

An exemplary embodiment of the machine-learning module 226 is exemplified in FIG. 5. In this embodiment, the machine-learning module 226 is configured to execute various steps of a method 500 allowing generating network service patterns. As internal data and external data are being collected and processed by the machine-learning module 226, the machine-learning module 226 may start generating one or more predictions of network service patterns. In some embodiments, the machine-learning module 226 may take the form of an API. The API may be hosted by a system operating the network resource management tool 220 or may be hosted by a dedicated service platform accessible by the network resource management tool 220. At a step 510, the machine-learning module 226 may execute profiling of network service patterns which may be used to reinforce algorithm training instances stored in the training model database 228.

Figure 6:
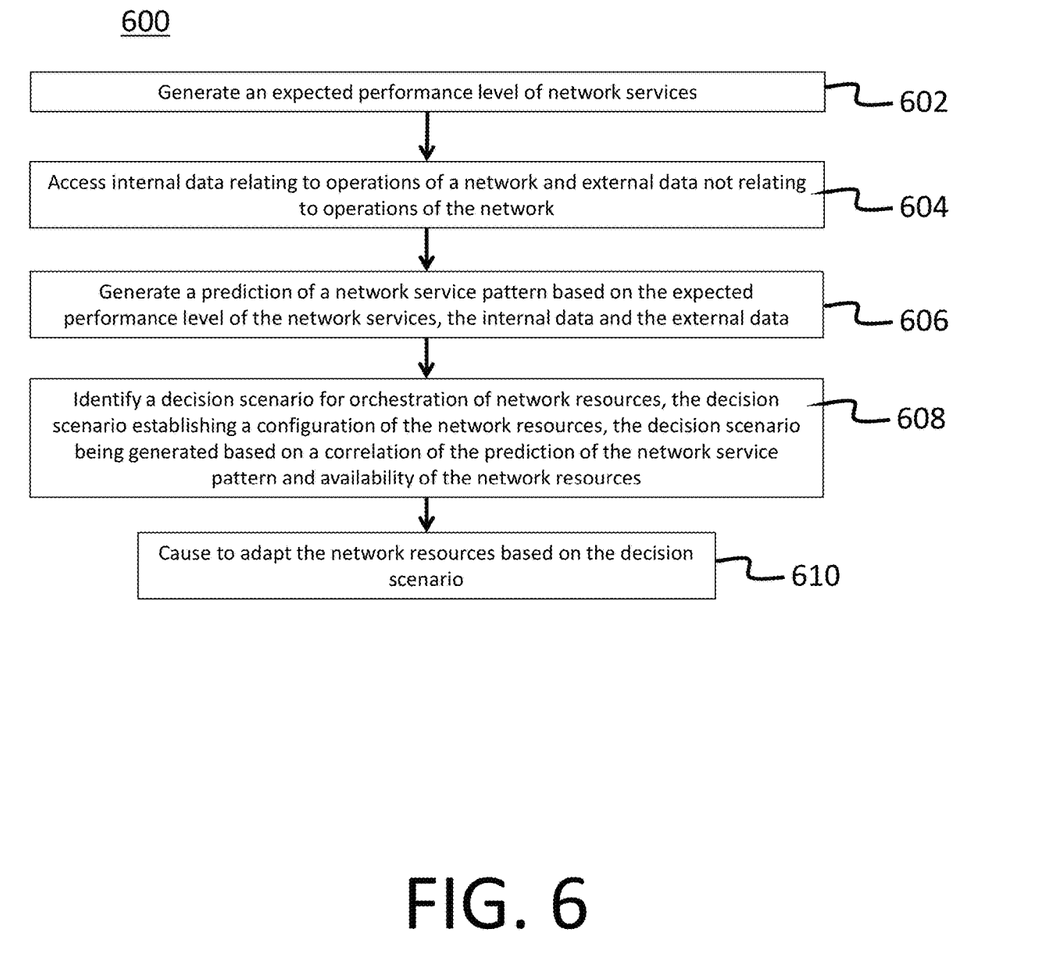
FIG. 6 is a diagram illustrating a first flowchart illustrating a computer-implemented method implementing embodiments of the present technology.

Turning now to FIG. 6, a flowchart illustrating a computer-implemented method 600 of executing a method for managing network resources enabling network services over a network is illustrated. In some embodiments, the computer-implemented method 600 may be (completely or partially) implemented on a computing environment similar to the computing environment 100, such as, but not limited to, a system operating the network management and orchestration module 222.

The method 600 comprises executing, at a step 602, generating an expected performance level of the network services. Then, at a step 604, the method 600 executes accessing internal data relating to operations of the network and external data not relating to operations of the network.

At a step 606, the method 600 executes generating a prediction of a network service pattern based on the expected performance level of the network services, the internal data and the external data. Then, at a step 608, the method 600 executes identifying a decision scenario for orchestration of the network resources, the decision scenario establishing a configuration of the network resources, the decision scenario being generated based on a correlation of the prediction of the network service pattern and availability of the network resources. At a step 610, the method 600 then executes causing to adapt the network resources based on the decision scenario.

In some embodiments, the method 600 may further execute monitoring at least one of a customer experience, a network performance and/or the performance level of the network services and causing to modify the decision scenario based on the at least one of the customer experience, the network performance and/or the performance level of the network services.

Figure 7:
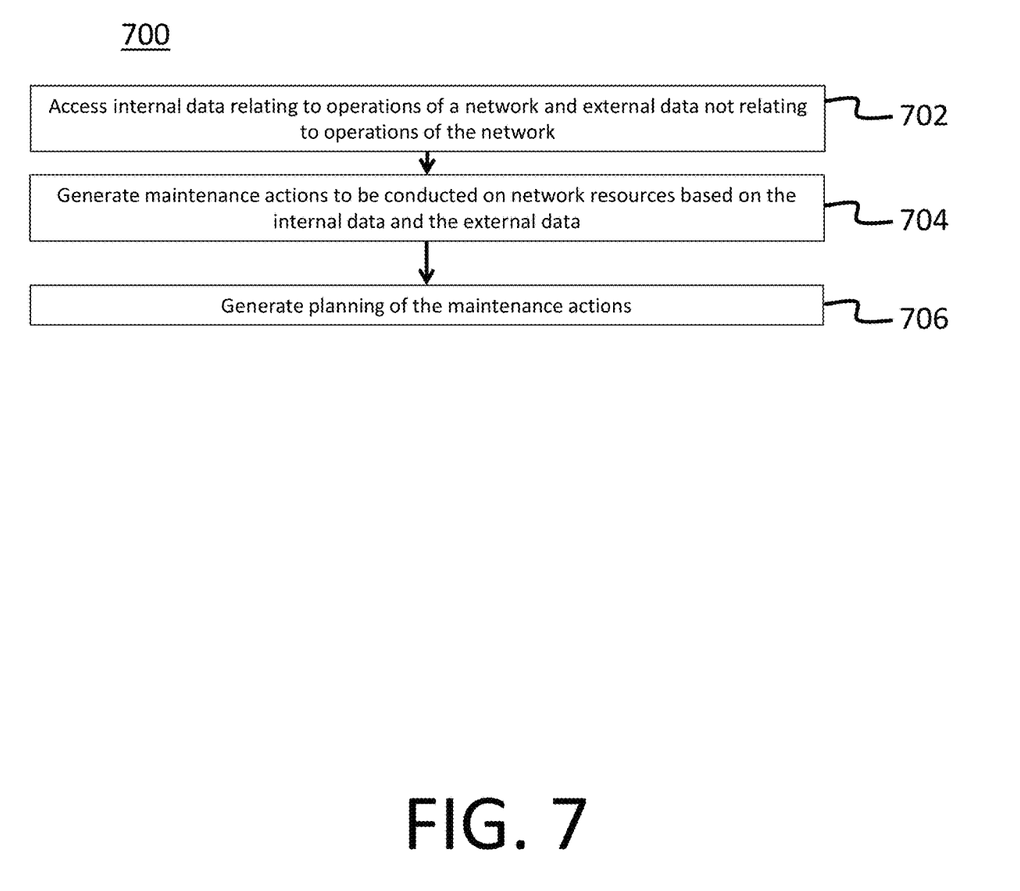
FIG. 7 is a diagram illustrating a second flowchart illustrating a computer-implemented method implementing embodiments of the present technology.

Turning now to FIG. 7, a flowchart illustrating a computer-implemented method 700 of executing a method for managing maintenance of network resources is illustrated. In some embodiments, the computer-implemented method 700 may be (completely or partially) implemented on a computing environment similar to the computing environment 100, such as, but not limited to, a system operating the network maintenance module 224.

The method 700 comprises executing, at a step 702, accessing internal data relating to operations of the network and external data not relating to operations of the network. Then, at a step 704, the method 700 executes generating maintenance actions to be conducted on the network resources based on the internal data and the external data. At a step 706, the method 700 executes generating planning of the maintenance actions.

While the above-described implementations have been described and shown with reference to particular steps performed in a particular order, it will be understood that these steps may be combined, sub-divided, or re-ordered without departing from the teachings of the present technology. At least some of the steps may be executed in parallel or in series. Accordingly, the order and grouping of the steps is not a limitation of the present technology.

It should be expressly understood that not all technical effects mentioned herein need to be enjoyed in each and every embodiment of the present technology.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

What is claimed is:

1. A computer-implemented method for managing network resources enabling network services over a network, the method comprising:
   determining a desired performance level of the network services, the desired performance level being associated with service metrics that establish compliance with a service level agreement;
   accessing internal data relating to operations of the network and external data not relating to operations of the network;
   predicting, based on the external data, network service degradation caused by external events;
   generating a prediction of a network service pattern based on the desired performance level of the network services, the internal data and the external data;
   identifying a decision scenario for orchestration of the network resources, the decision scenario establishing a configuration of the network resources, the decision scenario being generated based on a correlation of the prediction of the network service pattern, the network service degradation, and availability of the network resources;
   causing to adapt the network resources based on the decision scenario;
   monitoring a customer experience corresponding to the network services;
   modifying the decision scenario based on the customer experience, thereby generating a modified decision scenario; and
   causing to adapt the network resources based on the modified decision scenario.

2. The method of claim 1, further comprising:
   monitoring at least one of a network performance or a performance level of the network services; and
   further modifying the decision scenario based on the at least one of the network performance or the performance level of the network services.

3. The method of claim 1, wherein the internal data comprises data created by a network service provider as a result of operating the network.

4. The method of claim 1, wherein the internal data comprises data collected at edges or nodes of the network.

5. The method of claim 1, wherein the internal data relates to at least one of performances or configurations of the network resources.

6. The method of claim 1, wherein the internal data comprises at least one of network data, operations data, customer data or product data.

7. The method of claim 1, wherein the external data comprises at least one of environmental data, regional data, industry data or financial data.

8. The method of claim 1, wherein the network service pattern comprises a layout of the network.

9. The method of claim 1, wherein the correlation is identified and mapped on a graph.

10. The method of claim 1, wherein the availability of the network resources relates to at least one of a computing power, a storage capacity or a network capacity.

11. The method of claim 1, wherein causing to adapt the network resources comprises re-arranging a layout of the network.

12. The method of claim 11, wherein re-arranging a layout of the network comprises modifying which frequency bands or channels are available for the network.

13. A system for managing network resources enabling network services over a network, the system comprising:
   at least one processor;
   memory comprising executable instructions which, upon being executed by the at least one processor, cause the system to:
   determine a desired performance level of the network services, the desired performance level being associated with service metrics that establish compliance with a service level agreement;
   access internal data relating to operations of the network and external data not relating to operations of the network;
   predict, based on the external data, network service degradation caused by external events;

generate a prediction of a network service pattern based on the desired performance level of the network services, the internal data and the external data;

identify a decision scenario for orchestration of the network resources, the decision scenario establishing a configuration of the network resources, the decision scenario being generated based on a correlation of the prediction of the network service pattern, the network service degradation, and availability of the network resources;

cause to adapt the network resources based on the decision scenario;

monitor a customer experience corresponding to the network services;

modify the decision scenario based on the customer experience, thereby generating a modified decision scenario; and cause to adapt the network resources based on the modified decision scenario.

14. The system of claim 13, wherein the instructions further cause the system to:

generate maintenance actions to be conducted on the network resources based on the internal data and the external data; and generate planning of the maintenance actions.

15. The system of claim 13, wherein the internal data comprises data created by a network service provider as a result of operating the network.

16. The system of claim 13, wherein the internal data comprises data collected at edges or nodes of the network.

17. The system of claim 13, wherein the internal data relates to at least one of performances or configuration of the network resources.

18. The system of claim 13, wherein the internal data comprises at least one of network data, operations data, customer data or product data.

19. The system of claim 13, wherein the external data comprises at least one of environmental data, regional data, industry data or financial data.

20. A non-transitory computer-readable medium, the non-transitory computer-readable medium comprising control logic which, upon execution by a processor, causes:

determining a desired performance level of network services for a network, the desired performance level being associated with service metrics that establish compliance with a service level agreement;

accessing internal data relating to operations of a network and external data not relating to operations of the network;

predicting, based on the external data, network service degradation caused by external events;

generating a prediction of a network service pattern based on the desired performance level of the network services, the internal data and the external data;

identifying a decision scenario for orchestration of network resources, the decision scenario establishing a configuration of the network resources, the decision scenario being generated based on a correlation of the prediction of the network service pattern, the network service degradation, and availability of the network resources;

causing to adapt the network resources based on the decision scenario;

monitoring a customer experience corresponding to the network services;

modifying the decision scenario based on the customer experience, thereby generating a modified decision scenario; and causing to adapt the network resources based on the modified decision scenario.

* * * * *